US012654391B2

(12) United States Patent
Discekici et al.

(10) Patent No.: US 12,654,391 B2
(45) Date of Patent: Jun. 16, 2026

(54) KIT FOR THREE-DIMENSIONAL PRINTING

(71) Applicant: PERIDOT PRINT LLC, Palo Alto, CA (US)

(72) Inventors: Emre Hiro Discekici, San Diego, CA (US); Emily Levin, San Diego, CA (US); Jake Thomas, San Diego, CA (US)

(73) Assignee: Peridot Print LLC, Palo Alto, CA (US)

( * ) Notice: Subject to any disclaimer, the term of this patent is extended or adjusted under 35 U.S.C. 154(b) by 78 days.

(21) Appl. No.: 18/713,944

(22) PCT Filed: Dec. 3, 2021

(86) PCT No.: PCT/US2021/061817
§ 371 (c)(1),
(2) Date: May 28, 2024

(87) PCT Pub. No.: WO2023/101688
PCT Pub. Date: Jun. 8, 2023

(65) Prior Publication Data
US 2025/0018644 A1 Jan. 16, 2025

(51) Int. Cl.
*B29C 64/165* (2017.01)
*B33Y 10/00* (2015.01)
*B33Y 70/00* (2020.01)

(52) U.S. Cl.
CPC ............. *B29C 64/165* (2017.08); *B33Y 10/00* (2014.12); *B33Y 70/00* (2014.12)

(58) Field of Classification Search
CPC ........ B29C 64/165; B33Y 10/00; B33Y 70/00
See application file for complete search history.

(56) References Cited

U.S. PATENT DOCUMENTS

| | | | | | |
|---|---|---|---|---|---|
| 4,967,207 | A | * | 10/1990 | Ruder | B41J 2/17509 |
| | | | | | 347/7 |
| 5,117,244 | A | * | 5/1992 | Yu | B41J 2/16508 |
| | | | | | 347/29 |
| 6,283,576 | B1 | * | 9/2001 | Premnath | B41J 2/16508 |
| | | | | | 347/29 |
| 8,633,721 | B1 | * | 1/2014 | Ames | G01R 1/07328 |
| | | | | | 324/750.16 |
| 9,186,918 | B1 | * | 11/2015 | Young | B41J 11/0085 |
| 10,857,733 | B2 | | 12/2020 | Zhao et al. | |

(Continued)

FOREIGN PATENT DOCUMENTS

| | | |
|---|---|---|
| CN | 104589649 B | 1/2017 |
| JP | 2019-084693 A | 6/2019 |

(Continued)

*Primary Examiner* — Nahida Sultana
(74) *Attorney, Agent, or Firm* — Dierker & Kavanaugh, P.C.

(57) ABSTRACT

A kit for three-dimensional (3D) printing is described. The kit comprises a build material composition: a fusing agent composition including a radiation absorber present in an amount ranging from about 0.01 wt % to about 2.0 wt % of a total weight of the fusing agent composition, wherein the radiation absorber absorbs radiation at a wavelength range within the visible light spectrum; and a fusing assist composition including a first co-solvent; a second co-solvent; and a balance of water.

13 Claims, 4 Drawing Sheets

(56)  References Cited

U.S. PATENT DOCUMENTS

| | | | | |
|---|---|---|---|---|
| 2004/0263588 | A1* | 12/2004 | Ansier | B41J 2/17506 |
| | | | | 347/85 |
| 2007/0241482 | A1 | 10/2007 | Giller et al. | |
| 2013/0209670 | A1* | 8/2013 | Somekh | B41J 2/14 |
| | | | | 347/108 |
| 2013/0321535 | A1* | 12/2013 | Mauck | B41J 2/14145 |
| | | | | 347/85 |
| 2015/0091993 | A1* | 4/2015 | Piatt | B41J 11/04 |
| | | | | 347/102 |
| 2016/0229128 | A1* | 8/2016 | Dayagi | B28B 17/0081 |
| 2017/0247552 | A1* | 8/2017 | Prasad | B41M 5/0023 |
| 2018/0002459 | A1 | 1/2018 | Endo et al. | |
| 2024/0341931 | A1* | 10/2024 | Chavez | B33Y 50/00 |
| 2024/0342800 | A1* | 10/2024 | Crous | B22F 10/47 |
| 2024/0342801 | A1* | 10/2024 | Adcock | B23K 26/0604 |

FOREIGN PATENT DOCUMENTS

| | | | | | |
|---|---|---|---|---|---|
| WO | 2019/124154 | A1 | 6/2019 | | |
| WO | WO-2019108288 | A1 * | 6/2019 | | C09D 11/106 |
| WO | 2019/182614 | A1 | 9/2019 | | |
| WO | 2020/060588 | A1 | 3/2020 | | |
| WO | 2021/118555 | A1 | 6/2021 | | |
| WO | 2021/174230 | A1 | 9/2021 | | |
| WO | 2021/175886 | A1 | 9/2021 | | |

* cited by examiner

KIT FOR THREE-DIMENSIONAL PRINTING

BACKGROUND

Three-dimensional (3D) printing is an additive process used to make three-dimensional solid parts from a digital model. 3D printing is often used in rapid product prototyping, mold generation, mold master generation, and short run manufacturing. 3D printing techniques are considered additive processes because they involve the application of successive layers of material. This is unlike traditional machining processes, which often rely upon the removal of material to create the final part.

DETAILED DESCRIPTION

Figure 1A:
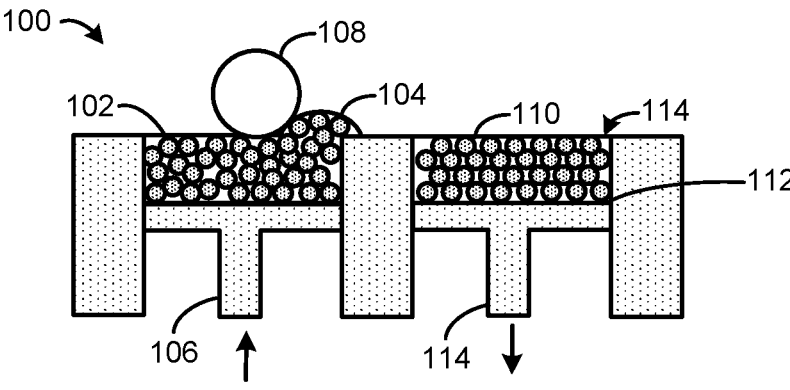
FIGS. 1A-1F schematically depict an example 3D-printing method.

Before particular embodiments of the present kit and other aspects are disclosed and described, it is to be understood that the present kit and other aspects are not limited to the particular process and materials disclosed herein as such may vary to some degree. It is also to be understood that the terminology used herein is used for the purpose of describing particular embodiments only and is not intended to be limiting, as the scope of the present method and other aspects will be defined only by the appended claims and equivalents thereof.

In the present specification, and in the appended claims, the following terminology will be used:

The singular forms "a", "an" and "the" include plural referents unless the context clearly dictates otherwise. Thus, for example, reference to "a co-solvent" includes reference to one or more of such co-solvents, unless otherwise stated.

The terms "about" and "approximately" when referring to a numerical value or range is intended to encompass the values resulting from experimental error that can occur when taking and/or making measurements.

Concentrations, amounts, and other numerical data may be presented herein in a range format. It is to be understood that such a range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a weight range of approximately 1 wt. % to approximately 20 wt. % should be interpreted to include not only the explicitly recited concentration limits of 1 wt. % to approximately 20 wt. %, but also to include individual concentrations such as 2 wt. %, 3 wt. %, 4 wt. %, and sub-ranges such as 5 wt. % to 10 wt. %, 10 wt. % to 20 wt. %, etc.

Some examples of three-dimensional (3D) printing may utilize a fusing agent (including a radiation absorber) to pattern a build material. In these examples, an entire layer of the build material is exposed to electromagnetic radiation, but only the patterned region (which, in some instances, is less than the entire layer) of the build material is fused/coalesced and hardened to become a layer of a 3D part. In the patterned region, the fusing agent at least partially penetrates into voids between particles of the build material, and is also capable of spreading onto the exterior surface of the build material particles. This fusing agent absorbs radiation and converts the absorbed radiation to thermal energy, which in turn fuses/coalesces the build material that is in contact with the fusing agent. Fusing/coalescing causes the build material particles to join or blend to form a single entity (i.e., the layer of the 3D part). Fusing/coalescing may involve at least partial thermal merging, melting, binding, and/or some other mechanism that coalesces the build material to form the layer of the 3D part.

In some examples, exposure of the layer of build material with a colorless UV-radiation absorber patterned thereon to radiation in the UV band of the electromagnetic radiation spectrum is used to effect fusion/coalescence of the build material. Other examples of fusing agents include tungsten bronze low tint fusing agents which require irradiation with near-infrared (NIR) fuse lamps. The use of such fusing agents and radiation exposure may enable the production of white or off-white parts. However, the use of UV radiation is dangerous, lacks efficiency and involves a higher impact for powder degradation while tungsten bronze low tint fusing agents are expensive and require the use of NIR lamps.

Disclosed herein is a kit for three-dimensional (3D) printing, comprising:

a build material composition;

a fusing agent composition including:

a radiation absorber present in an amount ranging from about 0.01 wt % to about 2.0 wt % of a total weight of the fusing agent composition, wherein the radiation absorber absorbs radiation at a wavelength range within the visible light spectrum; and a fusing assist composition including:

a first co-solvent;

a second co-solvent; and a balance of water.

Also described herein is a method of three-dimensional (3D) printing, comprising:

applying a build material composition to form a build material layer;

selectively applying a fusing agent composition on a portion of the build material layer, the fusing agent composition including:

a radiation absorber present in an amount ranging from about 0.01 wt % to about 2.0 wt % of a total weight of the fusing agent composition, wherein the radiation absorber absorbs radiation at a wavelength range within the visible light spectrum;

selectively applying a fusing assist composition on the portion of the build material layer, the fusing assist composition including:

a first co-solvent;

a second co-solvent; and a balance of water; and exposing the applied fusing agent and fusing assist compositions and the portion of the build material layer to radiation at the wavelength range within the visible light spectrum to fuse the portion of the build material layer and to form a layer of a three-dimensional (3D) part.

The present inventors noted that some color is inherently imparted to a 3D-printed part through the use of visible-light absorbing pigments as radiation absorbers, which for parts intended to be white or off-white in colour is not desirable. However, the present inventors found that a fusing assist composition, as part of a kit for 3D printing as described herein, unexpectedly enables a reduction in the amount of radiation absorber applied to a build material composition to effect fusion/coalescence following exposure to radiation at a wavelength range within the visible light spectrum, such as light emitted from blue LEDs.

Through the use of the 3D-printing kit described herein, a 3D part may be formed without the use of tungsten bronze, and without the use of a UV light absorber, instead utilizing visible light LED light sources which may reduce the costs of producing the 3D part, allow lower bed temperatures and thereby increase color uniformity, selectivity and safety, and reduce build material degradation. White or off-white layer, as used herein, includes or refers to a neutral white color or a near neutral white color. That is, the white layer is not limited to neutral white, which may be referred to as a pure white.

A Kit for Three-Dimensional (3D) Printing

In one aspect of the present disclosure, there is provided a kit for three-dimensional (3D) printing. The kit comprises a fusing assist composition, a fusing agent composition and a build material composition as described herein. Any example of the fusing assist composition, fusing agent composition or build material composition may be used in any combination in the examples of the 3D printing kit. The components of the kit may be maintained separately until used together in examples of the 3D printing method disclosed herein. The kit may be used in additive 3D printing. As noted above, 3D printing systems may generate 3D objects based on structural design data. This may involve a designer generating a 3D model of an object to be generated, for example using a computer aided design (CAD) application. The model may define the solid portions of the object.

Build Material Composition

As used herein, a build material composition includes or refers to a composition including a build material, which may be fused to generate a 3D object. The build material composition may comprise a polymeric or polymeric composite build material. As used herein, the term "polymeric build material" may refer to crystalline or semi-crystalline polymer. As used herein, the term "polymeric composite build material" may refer to composite material made up of polymer and ceramic.

Examples of semi-crystalline polymers include semi-crystalline thermoplastic materials with a wide processing window of greater than 5° C. (i.e., the temperature range between the melting point and the re-crystallization temperature). Some specific examples of the semi-crystalline thermoplastic materials include polyamides (PAS) (e.g., PA 11/nylon 11, PA 12/nylon 12, PA 6/nylon 6, PA 8/nylon 8, PA 9/nylon 9, PA 66/nylon 66, PA 612/nylon 612, PA 812/nylon 812, PA 912/nylon 912, etc.). Other examples of crystalline or semi-crystalline polymers suitable for use as the polymeric build material include modified polyamides, polyethylene, polypropylene, and polyoxomethylene (i.e., polyacetals), polyethylene terephthalate (PET), while amorphous variations of these materials may also be used as alternative build materials. Still other examples of suitable polymeric build materials include polystyrene, polycarbonate, polyester, polyurethanes, other engineering plastics, and blends or copolymers of any two or more of the polymers listed herein. Core shell polymer particles of these materials may also be used.

Any of the previously listed crystalline or semi-crystalline polymers may be combined with ceramic material to form the polymeric composite build material. Examples of suitable ceramic material include metal oxides, inorganic glasses, carbides, nitrides and borides. Some specific examples include alumina ($Al_2O_3$), zinc oxide (ZnO), glass, silicon mononitride (SiN), silicon dioxide ($SiO_2$), zirconia ($ZrO_2$), titanium dioxide ($TiO_2$), or combinations thereof. The amount of ceramic material that may be combined with the crystalline or semi-crystalline polymer may depend on the materials used and the 3D part to be formed. In one example, the ceramic material may be present in an amount ranging from about 1 wt % to about 40 wt % based on the total weight of the polymeric composite build material.

The build material may be a powder, a powder-like material (which includes, for example, short fibers having a length that is greater than its width), a liquid, a paste, or a gel, such as a powder polymer. In some examples, the powder may be formed from, or may include, short fibers that may, for example, have been cut into short lengths from long strands or threads of material. In some examples, the build material may have a melting point ranging from about 50 degrees Celsius (° C.) to about 450° C., and the first co-solvent may reduce the melting point of the build material. Depending upon the composition of the composite, the melting or softening point may be higher or lower. As an example, the polymeric or polymeric composite build material may be a polyamide having a melting point of about 180° C.

When the build material is in powder form, the build material may be made up of similarly sized particles or differently sized particles. In an example, the average size of the particles of the build material in the build material composition ranges from about 2 micrometer (μm) to about 200 μm. In another example, the average particle size of the polymeric or polymeric composite build material ranges from about 20 μm to about 90 μm, or about 40 μm to about 50 μm. In still another example, the average particle size of the polymeric or polymeric composite build material is about 60 μm. Size, as used herein, refers to the diameter of a spherical particle, or the average diameter of a non-spherical particle (i.e., the average of multiple diameters across the particle), or the volume-weighted mean diameter of a particle distribution. In some examples, the average particle size may be a volume-weighted mean diameter of a particle distribution determined using laser diffraction or laser scattering (e.g., with a Malvern Mastersizer S, version 2.18).

In some examples, the build material composition may include a build material and a whitener. The whitener may include $ZnO_2$ or $TiO_2$, among other whitener fillers.

The build material composition may further include other components such as an antioxidant, a charging agent, a flow aid or a combination thereof. While several examples of these components are provided, it is to be understood that these components are selected to be thermally stable (i.e., will not decompose) at the 3D printing temperatures.

Antioxidant(s) may be added to the build material composition to prevent or slow molecular weight decreases of the polymeric or polymeric composite build material and/or may prevent or slow discoloration (e.g., yellowing) of the polymeric or polymeric composite build material by preventing or slowing oxidation of the polymeric or polymeric composite build material. In some examples, the antioxidant may include IRGANOX® 1098 (benzenepropanamide, N,N'-1,6-hexanediylbis(3,5-bis(1,1-dimethylethyl)-4-hy-droxy)), IRGANOX® 254 (a mixture of 40% triethylene glycol bis(3-tert-butyl-4-hydroxy-5-methylphenyl), polyvi-nyl alcohol and deionized water), and/or other sterically hindered phenols. In other examples, the antioxidant may include a phosphite and/or an organic sulfide (e.g., a thio-ester). In an example, the antioxidant may be included in the build material composition in an amount ranging from about 0.01 wt % to about 5 wt %, based on the total weight of the build material composition.

Charging agent(s) may be added to suppress tribo-charg-ing. Example charging agents include aliphatic amines (which may be ethoxylated), aliphatic amides, quaternary ammonium salts (e.g., behentrimonium chloride or cocami-dopropyl betaine), esters of phosphoric acid, polyethylene glycol esters, or polyols. Some commercially available charging agents include HOSTASTAT® FA 38 (natural based ethoxylated alkylamine), HOSTASTAT® FE2 (fatty acid ester), and HOSTASTAT® HS 1 (alkane sulfonate), available from Clariant Int. Ltd.). In some examples, the charging agent is added in an amount ranging from greater than 0 wt % to less than 5 wt % of the total weight of the build material composition.

Flow aid(s) may be added to improve the coating flowability of the build material composition. The flow aid may be particularly beneficial when the polymeric or poly-meric composite build material has an average particle size less than 25 μm. The flow aid may improve the flowability of the build material composition by reducing the friction, the lateral drag, and the tribocharge buildup (by increasing the particle conductivity). Examples flow aids include tri-calcium phosphate (E341), powdered cellulose (E460 (ii)), magnesium stearate (E470b), sodium bicarbonate (E500), sodium ferrocyanide (E535), potassium ferrocyanide (E536), calcium ferrocyanide (E538), bone phosphate (E542), sodium silicate (E550), silicon dioxide (E551), calcium silicate (E552), magnesium trisilicate (E553a), tal-cum powder (E553b), sodium aluminosilicate (E554), potas-sium aluminum silicate (E555), calcium aluminosilicate (E556), bentonite (E558), aluminum silicate (E559), stearic acid (E570), or polydimethylsiloxane (E900). In some examples, the flow aid is added in an amount ranging from greater than 0 wt % to less than 5 wt % based upon the total weight of the build material composition.

Also disclosed herein is a method of forming a build material composition for 3D printing. The method includes mixing the polymeric or polymeric composite build material with the antioxidant, the charging agent, the flow aid, or a combination thereof when the build material composition includes the antioxidant, the charging agent, the flow aid, or a combination thereof. One example of the method com-prises: mixing a polymeric or polymeric composite build material with an antioxidant, a charging agent, a flow aid, or a combination thereof.

The mixing may be accomplished by any suitable means. For example, the polymeric or polymeric composite build material may be mixed with the antioxidant, charging agent and flow aid (if used) using a mixer (e.g., an industrial paddle mixer, an industrial high shear mixer, a resonant acoustic mixer, jet mills, etc.). The mixer may also be a mixer mill, such as a ball mill, powder mill, etc. Some mixers, such as jet mills, may be used for both mixing and particle size reduction.

In the examples disclosed herein, it is to be understood that the mixing may be performed in a printer, or in a separate powder management station. As examples, mixing in the printer may take place on a build area platform, in a build material supply, or in a separate mixing station. In some examples, the separate printing station may be set up to deliver the mixed build material composition to the supply and/or platform.

The polymeric or polymeric composite build material may be obtained (e.g., purchased) with the antioxidant, the charging agent, the flow aid, or a combination thereof mixed therein.

Fusing Agent Composition

A fusing agent composition of the present disclosure may be used to form white 3D parts without the use of UV light and/or UV radiation absorbers, and comprises a radiation absorber present in an amount ranging from about 0.01 wt % to about 2.0 wt % of a total weight of the fusing agent composition, wherein the radiation absorber absorbs radia-tion at a wavelength range within the visible light spectrum.

The radiation absorber acts as an active material that absorbs radiation. More particularly, the radiation absorber absorbs radiation at a wavelength range within the visible spectrum. For example, the radiation absorber may include a visible-light absorbing colorant, such as a dye or a pigment having any color. Example colors include cyan, magenta, yellow, red, blue, and black, among others. Non-limiting example radiation absorbers include carbon black, Direct Black (DB) 168, Acid Yellow (AY) 23, AY 17, Acid Red (AR) 52, AR 289, Reactive Red 180 (RR 180), Direct Blue (DB) 199, Pigment Blue (PB) 15:3, Pigment Red (PR) 122, Pigment Yellow (PY) 155, and PY 74. In some examples, the radiation absorber may include the dye or pigment and sodium or potassium counter ions. Other suitable active materials include near-infrared and visible light absorbing dyes.

The radiation absorber may include an absorbing colorant that absorbs radiation at the wavelength range between about 380 nanometers (nm) and about 780 nm, such as a sub-portion of the visible light spectrum which is between 380 nm and 780 nm. In some examples, the radiation absorber absorbs radiation at a wavelength of greater than about 380 nm and less than about 700 nm, such as less than 650 nm, less than 600 nm, less than 590 nm, less than 580 nm, less than 550 nm, less than 500 nm, less than 450 nm, and less than 400 nm. For example, the radiation absorber may include a colorant that reflects radiation at wavelengths of about 750 nm, 590 nm, 580 nm, 550 nm, 500 nm, 455 nm, 450 nm, or 380 nm, and absorbs other visible light wave-lengths which may be lower than the reflected wavelength (s). As further described herein, the radiation absorber may absorb at the wavelength range that includes and/or overlaps with a wavelength range of a light source (e.g., fusing lamp) used to fuse the build material.

In some examples, the radiation absorber is present in an amount ranging from about 0.01 wt % to about 2 wt %, from about 0.02 wt % to about 1.80 wt %, from about 0.03 wt % to about 1.6 wt %, from about 0.04 wt % to about 1.50 wt %, from about 0.05 wt % to about 1.2 wt %, from about 0.06 wt % to about 1 wt %, from about 0.07 wt % to about 0.90 wt %, from about 0.08 wt % to about 0.85 wt %, from about 0.09 wt % to about 0.80 wt %, from about 0.1 wt % to about 0.75 wt %, from about 0.2 wt % to about 0.70 wt %, from about 0.3 wt % to about 0.65 wt %, from about 0.4 wt % to about 0.60 wt of the total weight of the fusing agent composition. Unless otherwise stated, the amount of radia-tion absorber present is the amount of active radiation absorber present in the final composition and not the amount of a dispersion of radiation absorber included in the com-position.

In various examples, the fusing agent composition is aqueous based. The aqueous nature and particular components of the fusing agent composition may enhance the wetting properties of the fusing agent composition. This may allow for the radiation absorber within the fusing agent composition to be spread uniformly over the build material surface.

To form the fusing agent composition, the radiation absorber may be incorporated into a vehicle, which includes co-solvents and water. A vehicle includes or refers to a liquid in which the radiation absorber is dispersed or dissolved in to form a fusing agent. The fusing agent composition may include other components, such as additives including buffers and biocides.

The fusing agent composition further comprises co-solvent(s) and a balance of water. The co-solvent(s) may allow for the radiation absorber to spread over the build material, when applied thereto, and/or penetrate into a layer of the build material. The co-solvents may have a boiling point of greater than about 120° C. and/or provide vapor pressure that is sufficiently low to prevent flammability. Classes of organic co-solvents that may be used in a water-based fusing agent composition include aliphatic alcohols, aromatic alcohols, diols, glycol ethers, polyglycol ethers, 2-pyrrolidones, caprolactams, formamides, acetamides, glycols, and long chain alcohols. Examples of these co-solvents include primary aliphatic alcohols, secondary aliphatic alcohols, 1,2-alcohols, 1,3-alcohols, 1,5-alcohols, 1,6-hexanediol or other diols (e.g., 1,5-pentanediol, 2-methyl-1,3-propanediol, etc.), ethylene glycol alkyl ethers, propylene glycol alkyl ethers, higher homologs ($C_6$-$C_{12}$) of polyethylene glycol alkyl ethers, triethylene glycol, tetraethylene glycol, tripropylene glycol methyl ether, N-alkyl caprolactams, unsubstituted caprolactams, both substituted and unsubstituted formamides, both substituted and unsubstituted acetamides, and the like. Other examples of organic co-solvents include dimethyl sulfoxide (DMSO), isopropyl alcohol, ethanol, pentanol, acetone, or the like.

Other examples of suitable co-solvents include water-soluble high-boiling point solvents, which have a boiling point of at least 120° C., or higher. Some examples of high-boiling point solvents include 2-pyrrolidone (i.e., 2-pyrrolidinone, boiling point of about 245° C.), 1-methyl-2-pyrrolidone (boiling point of about 203° C.), N-(2-hydroxyethyl)-2-pyrrolidone (boiling point of about 140° C.), 2-methyl-1,3-propanediol (boiling point of about 212° C.), and combinations thereof.

Specific examples of suitable co-solvents include 2-pyrrolidinone (2-P), triethylene glycol (3EG), propylene glycol, and PEG 300. In some examples, the co-solvents may be present in an amount ranging from about 0.01 wt % to about 20 wt %, about 0.1 wt % to about 20 wt %, about 0.5 wt % to about 20 wt %, about 1.0 wt % to about 20 wt %, about 2.0 wt % to about 18 wt %, about 3.0 wt % to about 17 wt %, about 4.0 wt % to about 16 wt %, about 5.0 wt % to about 15 wt %, or about 6.0 wt % to about 14 wt % of the total weight of the fusing agent composition, among other ranges of wt %. In some examples, the co-solvents are present in an amount of about 18 wt %, about 16 wt %, about 14 wt %, or about 12 wt % among other wt %.

Various examples are directed to methods of forming the fusing agent composition for 3D printing. The methods include mixing the radiation absorber with the co-solvents and water. The mixing may be provided by a variety of sources, such as a mixer. Example mixers include an industrial paddle mixer, a high shear mixer, a resonant acoustic mixer, and a jet mills, among others. In some examples, a mixer mill may be used such as a ball mill or power mill. In some examples, the mixing may be performed in the 3D printer or separately therefrom.

In various examples, the fusing agent composition further includes a surfactant. The surfactant may improve jettability of the fusing agent composition and/or allow for the fusing agent composition to spread uniformly and penetrate into a build material layer when applied. In some examples, the surfactant may be present in an amount ranging from about 0.01 wt % to about 1.0 wt % of the total weight of the fusing agent composition. Non-limiting example surfactants include a secondary alcohol ethoxylate, such as Tergitol™15-S-9, or other water-soluble non-ionic surfactants.

The fusing agent composition may further include other component(s). The other component(s) may include an additive such as a buffer and/or a biocide. In some examples, the total amount of biocide(s) in the fusing agent composition ranges from about 0 wt % to about 0.95 wt %. Example biocides include NUOSEPT® (Ashland Inc.), UCAR-CIDE™ and KORDEK™ and ROCIMA™ (Dow Chemical Co.), PROXEL® (Arch Chemicals) series, ACTICIDE® B20 and ACTICIDE® M20 and ACTICIDE® MBL (blends of 2-methyl-4-isothiazolin-3-one (MIT), 1,2-benzisothiazolin-3-one (BIT), and Bronopol) (Thor Chemicals), AXIDE™ (Planet Chemical), NIPACIDE™ (Clariant), blends of 5-chloro-2-methyl-4-isothiazolin-3-one (CIT or CMIT) and MIT under the tradename KATHON™ (Dow Chemical Co.).

Fusing Assist Composition

Fusing assist compositions of the present disclosure may be used to form white 3D-printed parts without the use of low tint fusing agents, or UV light and UV radiation absorbers. The fusing assist compositions comprise a first co-solvent, a second co-solvent and a balance of water. The fusing assist composition may include other components, such as additives including buffers and biocides.

The first co-solvent may provide a reduction in a melting point of a build material when the fusing agent composition comes in contact therewith. For example, the first co-solvent may have plasticizing characteristics when interacting with the build material. In some examples, the first co-solvent includes poly(trimethylene glycol), benzyl alcohol or diethylene glycol butyl ether, among other organic co-solvents.

The second co-solvent may provide miscibility to the plasticizing first co-solvent of the fusing assist composition. For example, the second co-solvent may provide miscibility for the first co-solvent with water. Examples of the second co-solvent include 2-hydroxyethyl pyrrolidone (HE2P), 1,5-pentanediol, 1,2-hexanediol, 2-pyrrolidinonetriethylene glycol, tetraethylene glycol, 2-methyl-1,3-propanediol, 1,6-hexanediol, diethylene glycol butyl ether, 1,2-propanediol, tripropylene glycol methyl ether, glycerol, ethylene glycol, propylene glycol, butylene glycol, pentylene glycol, hexylene glycol, ethylene glycol monomethyl ether, ethylene glycol monoethyl ether, ethylene glycol monopropyl ether, ethylene glycol monoisopropyl ether, ethylene glycol monobutyl ether, ethylene glycol monophenyl ether, ethylene glycol monobenzyl ether, propylene glycol methyl ether, diethylene glycol monomethyl ether, diethylene glycol monoethyl ether, diethylene glycol mono-n-butyl ether, dipropyleneglycol methyl ether, ethylene glycol dimethyl ether, ethylene glycol diethyl ether, ethylene glycol dibutyl ether, among other organic co-solvents.

In some examples, the first co-solvent is present in an amount ranging from about 10 wt % to about 35 wt % of the total weight of the fusing assist composition and the second co-solvent is present in an amount ranging from about 10 wt % to about 65 wt % of the total weight of the fusing assist composition. In some examples, the first co-solvent is present in an amount ranging from about 15 wt % to about 35 wt %, about 20 wt % to about 35 wt %, about 25 wt % to about 35 wt %, about 30 wt % to about 35 wt %, about 10 wt % to about 30 wt %, about 10 wt % to about 20 wt %, about 12.5 wt % to about 17.5 wt %, and about 15 wt % to about 30 wt %. In some examples, the second co-solvent is present in an amount ranging from about 15 wt % to about 55 wt %, about 20 wt % to about 50 wt %, about 25 wt % to about 50 wt %, about 30 wt % to about 50 wt %, about 40 wt % to about 50 wt %, about 15 wt % to about 40 wt %, and about 15 wt % to about 36 wt %.

In some examples, the first and second co-solvents may be present in a combined amount ranging from about 20 wt % to about 80 wt % of the total weight of the fusing assist composition. In some examples, the first and second co-solvents may be present in a combined amount ranging from about 30 wt % to about 80 wt %, about 35 wt % to about 80 wt %, about 40 wt % to about 80 wt %, about 50 wt % to about 80 wt %, about 60 wt % to about 80 wt %, about 20 wt % to about 70 wt %, about 20 wt % to about 60 wt %, about 20 wt % to about 50 wt %, about 20 wt % to about 40 wt %, about 20 wt % to about 30 wt %, about 20 wt %, about 30 wt %, about 40 wt %, about 50 wt %, about 60 wt %, about 65 wt %, about 66 wt %, among other wt % of the total weight of the fusing assist composition.

In various examples, the fusing assist composition further includes a surfactant. The surfactant may improve jettability of the fusing agent composition and/or allow for the fusing assist composition to spread uniformly and penetrate into a build material layer when applied. In some examples, the surfactant may be present in an amount ranging from about 0.01 wt % to about 1.0 wt % of the total weight of the fusing agent composition. Non-limiting example surfactants include a secondary alcohol ethoxylate, such as Tergitol™15-S-9, Tego Wet 510, or other water-soluble non-ionic surfactants.

The fusing assist composition may further include other component(s). The other component(s) may include an additive such as a buffer and/or a biocide. In some examples, the total amount of biocide(s) in the fusing agent composition ranges from about 0 wt % to about 0.95 wt %. Example biocides include NUOSEPT® (Ashland Inc.), UCARCIDE™ and KORDEK™ and ROCIMA™ (Dow Chemical Co.), PROXEL® (Arch Chemicals) series, ACTICIDE® B20 and ACTICIDE® M20 and ACTICIDE® MBL (blends of 2-methyl-4-isothiazolin-3-one (MIT), 1,2-benzisothiazolin-3-one (BIT), and Bronopol) (Thor Chemicals), AXIDE™ (Planet Chemical), NIPACIDE™ (Clariant), blends of 5-chloro-2-methyl-4-isothiazolin-3-one (CIT or CMIT) and MIT under the tradename KATHON™ (Dow Chemical Co.).

The fusing assist composition may allow for the radiation absorber of the fusing agent composition to spread over the build material, when applied thereto, and/or penetrate into a layer of the build material. The co-solvents of the fusing assist composition may have a boiling point of greater than about 200° C. and/or provide vapor pressure that is sufficiently low to prevent flammability. Additionally, the co-solvents of the fusing assist composition may plasticize (e.g., has plasticizing characteristics) the build material when in contact therewith, such that the build material may fuse using the fusing agent composition having the radiation absorber at concentrations of about 2.0% or less.

Various examples are directed to methods of forming the fusing assist composition for 3D printing. The methods include mixing the first co-solvent, the second co-solvent and water. The mixing may be provided by a variety of sources, such as a mixer. Example mixers include an industrial paddle mixer, a high shear mixer, a resonant acoustic mixer, and a jet mill, among others. In some examples, a mixer mill may be used such as a ball mill or power mill. In some examples, the mixing may be performed in the 3D printer or separately therefrom.

Method of Three-Dimensional (3D) Printing

In another aspect of the present disclosure, there is provided a method for three-dimensional (3D) printing. In some examples, the method may comprise applying a build material composition, as described herein, to form a build material layer; selectively applying a fusing agent composition, as described herein, on a portion of the build material layer, the fusing agent composition including a radiation absorber present in an amount ranging from about 0.01 wt % to about 2.0 wt % of a total weight of the fusing agent composition, wherein the radiation absorber absorbs radiation at a wavelength range within the visible light spectrum; selectively applying a fusing assist composition on the portion of the build material layer, the fusing assist composition including a first co-solvent, a second co-solvent, and a balance of water; and exposing the applied fusing agent and fusing assist compositions and the portion of the build material layer to radiation at the wavelength range within the visible light spectrum to fuse the portion of the build material layer and to form a layer of a three-dimensional (3D) part. The method may be implemented by a 3D printing apparatus and using any of the example fusing assist compositions, fusing agent compositions, build material compositions and/or kit as described herein.

An additive 3D printing process may be performed in several stages using a 3D printing system. In a build material depositing stage, a layer of build material composition (e.g., powder) is deposited onto a build platform of a 3D printing system. In the fusing agent depositing stage, the fusing agent composition is distributed onto the layer of build material composition. For example, the fusing agent composition is deposited at positions where it is intended for the build material to be bound together. In the fusing assist depositing stage, the fusing assist composition is distributed onto the layer of build material composition where the fusing agent composition was deposited. The fusing assist composition may be deposited before, after or simultaneously with the fusing agent composition. Thermal energy is applied to increase the temperature of build material composition and to cause particles of the build materiel to melt and coalesce or bind together. Firstly, thermal energy may be applied to heat the bed and build material to 5-85° C. below the melting temperature of the build material, and then thermal energy (electromagnetic energy converted to thermal by the fusing agent) is applied to heat/melt the polymer powder of the build material. This stage may be referred to as a melting/coalescence stage, a curing stage, a curing process or an annealing process/stage. For example, curing may be achieved by increasing the amount of thermal energy provided in the fabrication chamber. Following the curing process, the build material becomes bound or solidified.

As described above, the method includes applying a build material composition to form a build material layer. The application may be based on a 3D model. In some examples, following application, the build material layer may be exposed to heating. Heating may be performed to pre-heat the build material composition, and thus the heating temperature may be below the melting point or softening point of the build material composition. As such, the temperature selected will depend upon the build material composition that is used. As examples, the pre-heating temperature may be from about 5° C. to about 80° C. below the melting point or softening point of the polymeric or polymeric composite build material. In an example, the pre-heating temperature ranges from about 50° C. to about 250° C. In another example, the pre-heating temperature ranges from about 150° C. to about 170° C.

Pre-heating the build material layer may be accomplished by using any suitable heat source that exposes all of the build material composition deposited to the heat. Examples of the heat source include an electromagnetic radiation source, such as an IR or near-IR light source.

The method further includes selectively applying a fusing agent composition on a portion of the build material layer. The fusing agent composition comprises the radiation absorber present in the amount ranging from about 0.01 wt % to about 2.0 wt % of a total weight of the fusing agent composition, co-solvents present in an amount ranging from about 0.01 wt % to about 20 wt % of the total weight of the fusing agent composition, and a balance of water. The radiation absorber absorbs radiation at a wavelength range within the visible light spectrum.

The fusing agent composition may be dispensed at a contone level of as low as 5 contone (which refers to the number of drops, which is divided by 256, that will be placed on average onto each pixel), a significant reduction from the required 40-90 contone in the absence of a fusing assist composition.

The fusing agent composition is selectively applied such that the build material layer comprises the radiation absorber in an amount ranging from about 0.0001 wt % to about 0.1 wt %. The amount of fusing agent composition applied may vary depending on the concentration of the radiation absorber present in the fusing agent composition. For example, lower amounts of fusing agent composition containing a higher proportion of radiation absorber may be selectively applied relative to a different fusing agent composition containing a lower proportion of radiation absorber.

The method includes selectively applying a fusing assist composition on the same portion of the build material layer. The fusing assist composition comprises a first and second co-solvent present in a combined amount ranging from about 20 wt % to about 80 wt % of the total weight of the fusing assist composition. The fusing assist composition, and more specifically the first co-solvent of the fusing assist composition, plasticizes the build material, reducing its melting point when the fusing agent composition comes in contact therewith. The fusing assist composition may be deposited before, after or simultaneously with the fusing agent composition. In some examples, the fusing agent composition and fusing assist composition are applied by printing them onto the portion of the build material layer, for example using inkjet technology.

The fusing agent composition and the fusing assist composition may be applied in a ratio of from about 4:6 to about 1:25. In some examples, the fusing agent composition and the fusing assist composition are applied in a ratio of about 1:6.

The method includes exposing the applied fusing agent and fusing assist compositions and the portion of the build material layer to radiation at the wavelength range within the visible light spectrum to fuse the portion of the build material layer and to form a layer of a three-dimensional (3D) part. The layer of a 3D part may be white or off-white. The 3D part may include a layer of a portion of or a layer of the whole 3D object.

Exposing the applied fusing assist composition, the applied fusing agent composition and the portion of the build material layer to the radiation may include using a visible light-light source that emits the radiation of the range within the visible light spectrum. The visible light-light source may include a light emitting diode (LED) or other light source that emits light in the visible light spectrum. In some examples, the visible light-light source may emit 455 nm, 565 nm, 590 nm, 605 nm, or 625 nm light, among other wavelength ranges within the visible light spectrum. In some examples, the visible-light-light source may be a blue light emitting LED, In some examples, in response to exposing the applied fusing assist composition and the applied fusing agent composition to the radiation of the range within the visible light spectrum, the method may comprise absorbing the radiation of the range within the visible light spectrum and converting the radiation to thermal energy by the radiation absorber, and in response to the thermal energy, melting and fusing the build material layer, wherein a melting point of the build material composition is reduced by the first co-solvent of the fusing assist composition.

FIGS. 1A-1F illustrate a cross-sectional view of an example 3D printing system forming a layer of a part of a 3D object, consistent with the present disclosure. The 3D printing system 100 includes a supply bed 102 (including a supply of the build material composition 104), a delivery piston 106, a roller 108, a fabrication bed 110 (having a contact surface 112), and a fabrication piston 114. The components may be operatively connected to processor circuitry, such as a central processing unit (CPU) (not shown) of the printing system 100. The processor circuitry (e.g., running computer readable instructions stored on a non-transitory, tangible computer readable storage medium) manipulates and transforms data to control the components and to create a part of the 3D object. The data for the selective delivery of the build material composition and the fusing agent composition may be derived from a model of the 3D object.

The delivery piston 106 and the fabrication piston 114 may be the same type of piston, and are programmed to move in opposite directions. In some examples, to form a first layer of the 3D object, the delivery piston 106 may be programmed to push a predetermined amount of the build material composition 104 out of an opening in the supply bed 102, and the fabrication piston 114 may be programmed to move in the opposite direction of the delivery piston 106 to increase the depth of the fabrication bed 110. The delivery piston 106 may advance enough so that when the roller 108 pushes the build material composition 104 into the fabrication bed 110 and onto the contact surface 112, the depth of the fabrication bed 110 is sufficient so that a layer 114 of the build material composition 104 may be formed in the bed 110. The roller 108 is capable of spreading the build material composition 104 into the fabrication bed 110 to form the layer 114, which is relatively uniform in thickness.

In some examples, the roller 108 may be replaced by other tools, such as a blade for spreading different types of powders, or a combination of a roller and a blade. In some examples, the printing system 100 may not include a supply bed 102 and may include other delivery systems to supply the build material composition 104 to the fabrication bed 110, such as a trough, a hopper, an auger conveyer, among others. For example, the printing system 100 may include a trough with the supply of the build material composition 104 which the roller 108 (or other spreader) may push the build material composition 104 from and into the fabrication bed 110.

Figure 1B:
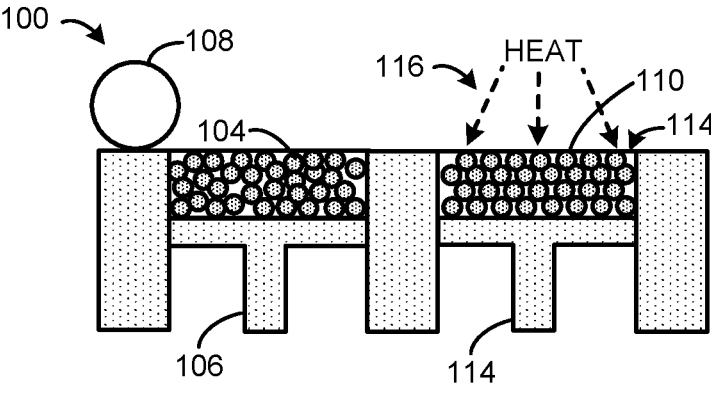

After the layer 114 of the build material composition 104 is introduced into the fabrication bed 110, the layer 114 is exposed to heating, as shown at 116 of FIG. 1B. Heating is performed to pre-heat the build material composition 104, such as to a heating temperature below the melting point of the build material composition 104. As such, the heating temperature selected depends upon the build material that is used. As examples, the heating temperature may be from about 5° C. to about 30° C. below the melting point of the build material composition 104. In some examples, the build material composition 104 is heated to a temperature ranging from about 50° C. to about 430° C., about 50° C. to about 400° C., 50° C. to about 350° C., about 50° C. to about 300° C., about 50° C. to about 250° C., about 50° C. to about 200° C., about 50° C. to about 150° C., about 50° C. to about 100° C., about 100° C. to about 430° C., about 150° C. to about 430° C., about 200° C. to about 430° C., about 250° C. to about 430° C., about 300° C. to about 430° C., or about 350° C. to about 430° C., among other ranges.

The build material composition 104 in the layer 114 may be pre-heated using a heat source that exposes the build material composition 104 in the fabrication bed 110 to the heat. Example heat sources include an electromagnetic radiation source, such as an IR or near-IR light source.

Figure 1C:
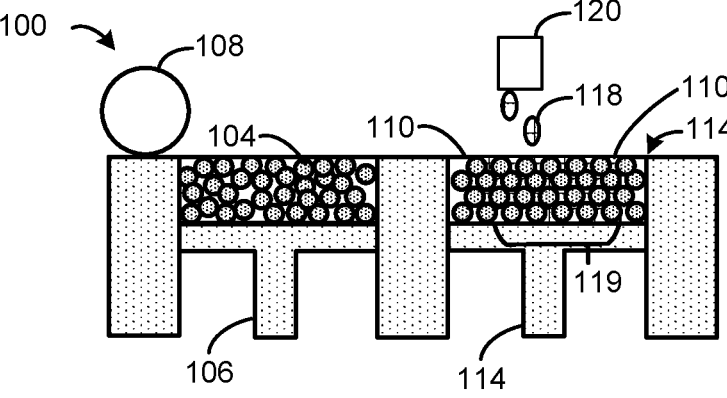

After pre-heating the layer 114, the previously described fusing agent composition 118 is selectively applied on a portion 119 of the build material composition 104 in the layer 114, as shown by FIG. 1C. The fusing agent composition 118 may be dispensed from an inkjet applicator 120 (e.g., a thermal inkjet or a piezoelectric inkjet printhead). While a single inkjet applicator 120 is shown in FIG. 1C, multiple inkjet applicators may be used that span the width of the fabrication bed 110. The inkjet applicator(s) 120 may be attached to a moving XY stage or a translational carriage (not shown) that moves the inkjet applicator(s) 120 adjacent to the fabrication bed 110 to deposit the fusing agent composition 118 to target portion(s) (e.g., portion 119) of the layer 114.

The inkjet applicator(s) 120 may be programmed to receive commands from processor circuitry and to deposit the fusing agent composition 118 according to a pattern of a cross-section for the layer of the part of (or the whole) 3D object to be formed. The cross-section of the layer of the part of or of the 3D object to be formed includes or refers to the cross-section that is parallel to the contact surface 112 as illustrated by FIG. 1A. The inkjet applicator(s) 120 selectively applies the fusing agent composition 118 on portions of the layer 114 that are to be fused to become a layer of the 3D object.

Figure 1D:
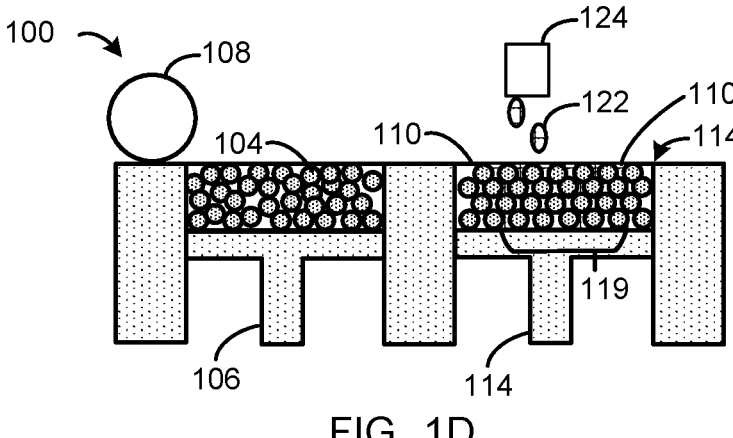
Figure 1E:
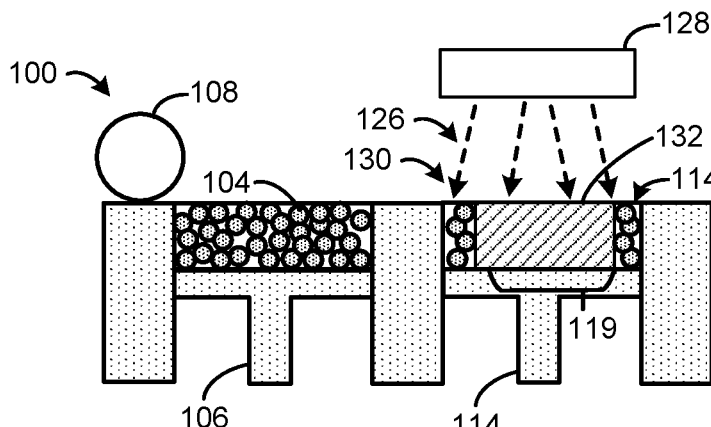

The previously described fusing assist composition 122 is selectively applied on the same portion 119 of the build material composition 104 in the layer 114 as the fusing agent composition was applied, as shown by FIG. 1D. The fusing assist composition 112 may be dispensed from an inkjet applicator 124 (e.g., a thermal inkjet or a piezoelectric inkjet printhead). While a single inkjet applicator 124 is shown in FIG. 1D, multiple inkjet applicators may be used that span the width of the fabrication bed 110. The inkjet applicator(s) 124 may be attached to a moving XY stage or a translational carriage (not shown) that moves the inkjet applicator(s) 124 adjacent to the fabrication bed 110 to deposit the fusing assist composition 122 to target portion(s) (e.g., portion 119) of the layer 114.

The inkjet applicator(s) 124 may be programmed to receive commands from processor circuitry and to deposit the fusing assist composition 122 according to a pattern of a cross-section for the layer of the part of (or the whole) 3D object to be formed. The cross-section of the layer of the part of or of the 3D object to be formed includes or refers to the cross-section that is parallel to the contact surface 112 as illustrated by FIG. 1A. The inkjet applicator(s) 124 selectively applies the fusing assist composition 122 on portions of the layer 114 that are to be fused to become a layer of the 3D object.

While the method has been described with sequential application of fusing agent composition 118 and fusing assist composition 122, these may be applied simultaneously.

After the fusing assist composition 122 is selectively applied in the target portion(s) 119, the layer 114 of the build material composition 104 and the fusing agent composition 118 and fusing assist composition 122 are exposed to radiation 126 as shown by FIG. 1D. As previously described, the radiation 126 is within the visible light spectrum. For example, a light source 128 that emits visible light, herein referred to as a visible light-light source, may be used. The light source 128 may include visible light LEDs, lamps, among other light sources. The light source 128 may be attached to a carriage that also holds the inkjet applicator(s) 120 and 124. The carriage may move the light source 128 into a position that is adjacent to the fabrication bed 110. The light source 128 may be programmed to receive commands from processor circuitry and to expose the layer 114 and applied fusing agent composition 118 and applied fusing assist composition 122 to the radiation 126 (e.g., visible light energy).

The length of time the radiation 126 is applied for, or the energy exposure time, may be dependent on characteristics of the light source 128, characteristics of the build material composition 104, and/or characteristics of the fusing agent composition 118 and/or characteristics of the fusing assist composition 122.

The fusing agent composition 118 converts the absorbed radiation to thermal energy, and promotes the transfer of the thermal energy (e.g., heat) to the build material composition 104 in contact with the fusing agent composition 118 and fusing assist composition 122 (e.g., in the portion(s) 119). The fusing agent composition 118 may elevate the temperature of the build material composition 104 in the portions(s) 119 near or above its melting point, allowing fusing (which may include melting, sintering, binding) of the build material to take place.

In some examples, the fusing agent composition 118 may cause heating of the build material composition 104 to below its melting point but to a temperature suitable to cause softening and bonding. The portion(s) not having the fusing agent composition 118 and fusing assist composition 122 applied thereto, such as the portion 130, absorb less energy, and the build material composition 104 within these portion(s) 130 generally does not exceed the melting point and does not fuse. This forms one layer 132 of a part of the 3D object 134 (FIG. 1D) to be formed.

Figure 1F:
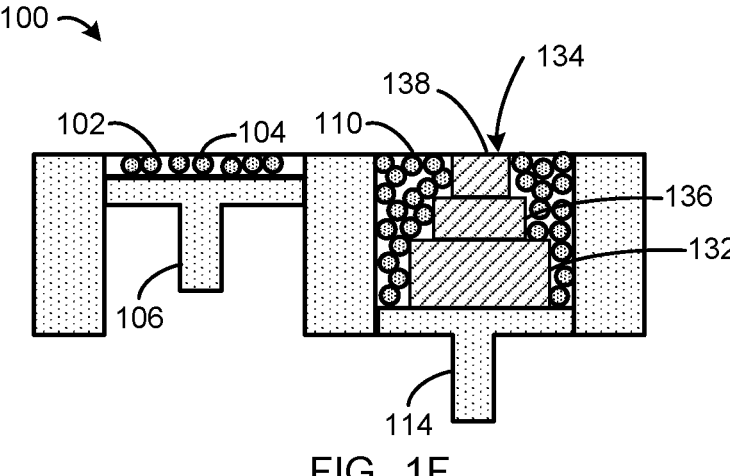

The above may be repeated to create subsequent layers 136, 138 as illustrated by FIG. 1F and to form the 3D object 134. Heat absorbed by a portion of the build material composition 104 on which fusing agent composition 118 is applied to or has penetrated may propagate to a previously solidified layer, such as layer 132, causing at least some of that layer 132 to heat up above its melting point. This effect may create interlayer bonding between adjacent layers (e.g., 132 and 136) of portions of the 3D object 134.

FIG. 1F illustrates an example 3D object 134 formed in the fabrication bed 110. Objects, parts of objects, and layers thereof may be a variety of sizes and shapes, and are not limited to that illustrated by FIG. 1.

As illustrated by FIG. 1F, as layers 132, 136, 138 are formed, the delivery piston 106 is pushed closer to the opening of the supply bed 102, and the supply of the build material composition 104 in the supply bed 102 is diminished (compared to FIG. 1A). The fabrication piston 114 is pushed further away from the opening of the fabrication bed 110 for the subsequent layer(s) of build material composition 104 and the fusing agent composition 118. At least some of the build material composition 104 may remain unfused after each layer 132, 136, 138 is formed, and the 3D object 134 may be partially surrounded by the unfused build material. When the 3D object 134 is complete, it may be removed from the fabrication bed 110, and the unfused build material in the fabrication bed 110 may be reused depending on process conditions.

The white layer may include a neutral white color or a near neutral white color. For example, the white layer of the 3D part may have coordinates of lightness (L*), red/green (a*), and yellow/blue (b*) in amounts ranging from about 80 L* to about 100 L*, about −3 a* to about 3 a*, and about −5 b* to about 5 b*. A near neutral white, as used herein, includes or refers to a color that appears to be a neutral white but that is not a neutral white, such as an off-white, a tan, light grey, an ivory, among others.

EXAMPLES

The following illustrates examples kits and related aspects described in the present disclosure. These examples should not be considered to restrict the present disclosure, but are merely in place to teach how to make example kits of the present disclosure.

Various experiments were directed to generating fusing agent compositions and fusing assist compositions, and printing white and/or near neutral white 3D parts using the generated fusing agent compositions and fusing assist compositions without the use of tungsten bronze.

In some experiments, the visible light color absorber carbon black was used as the radiation absorber as part of dispersions, and was present in amounts of 5 wt % and 0.1-1 wt % of the total weight of the fusing agent compositions. The fusing assist compositions included a co-solvent mixture of HE2P and benzyl alcohol, with a surfactant of Tergitol 15-S-9 and a balance of water. Table 1, Table 2 and Table 3 below provide the formulations of the fusing agent compositions and the fusing assist compositions respectively:

TABLE 1

Fusing Agent Composition A

|  | % active | wt % |
|---|---|---|
| Carbon black dispersion | 12.8 | 5 |
| 2-Pyrrolidinone (2-P) | 95 | 19 |
| Triethylene glycol (3EG) | 100 | 8 |
| Tegowet 510 | 100 | 0.75 |
| Crodafos 03A | 100 | 0.45 |
| Acticide B20 | 100 | 0.18 |
| Acticide M20 | 100 | 0.14 |
| Trilon M (as is) | 100 | 0.08 |
| DI H$_2$O | 100 | Balance |

TABLE 2

Fusing Agent Composition B

|  | % active | wt % |
|---|---|---|
| Carbon black dispersion | 15.01 | 0.1-1 |
| Propylene glycol | 100 | 1-10 |
| PEG 300 | 100 | 1-5 |
| 2-phenoxyethanol | 100 | 0.01-1 |
| Surfactant | 100 | 0.01-1 |
| DI H$_2$O | 100 | Balance |

TABLE 3

Fusing Assist Composition C

|  | wt % |
|---|---|
| 2-hydroxyethyl pyrrolidone (HE2P) | 50 |
| Benzyl alcohol | 16 |
| Tergitol 15-S-9 | 0.8 |
| DI H$_2$O | 32.45 |

Several two-dimensional (2D) print tests were performed to show that the fusing agent compositions had reliable jetting performance.

Figure 2:
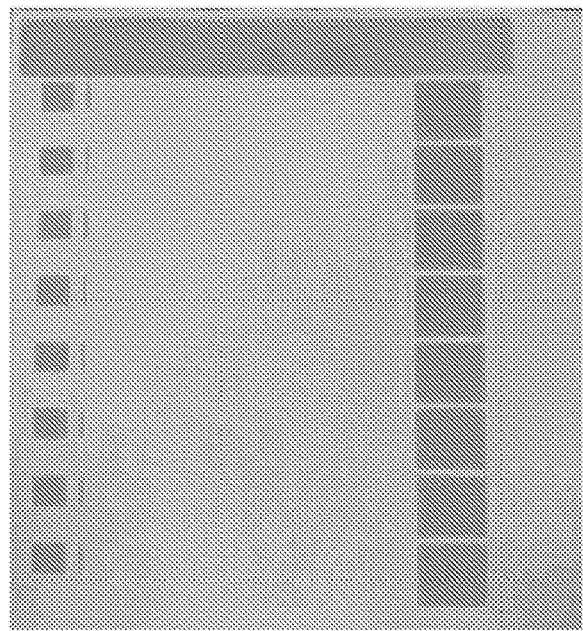
FIG. 2 is a photograph demonstrating printing decap of a fusing assist composition.

FIG. 2 illustrates experimental printing using a fusing assist composition, consistent with the present disclosure. More particularly, fusing assist composition C, as shown in Table 1, was printed in a 2D printing device and illustrated reliable printing. As can be seen in FIG. 2, good general printing and decap out to 16 seconds was observed. For this example, a light tint (AR-52) was added to the fusing assist composition to visualize printing performance.

Some experiments were directed to evaluating the fusing assist and fusing agent compositions on a 3D testbed and 3D printer using visible-light LED light.

Figure 3A:
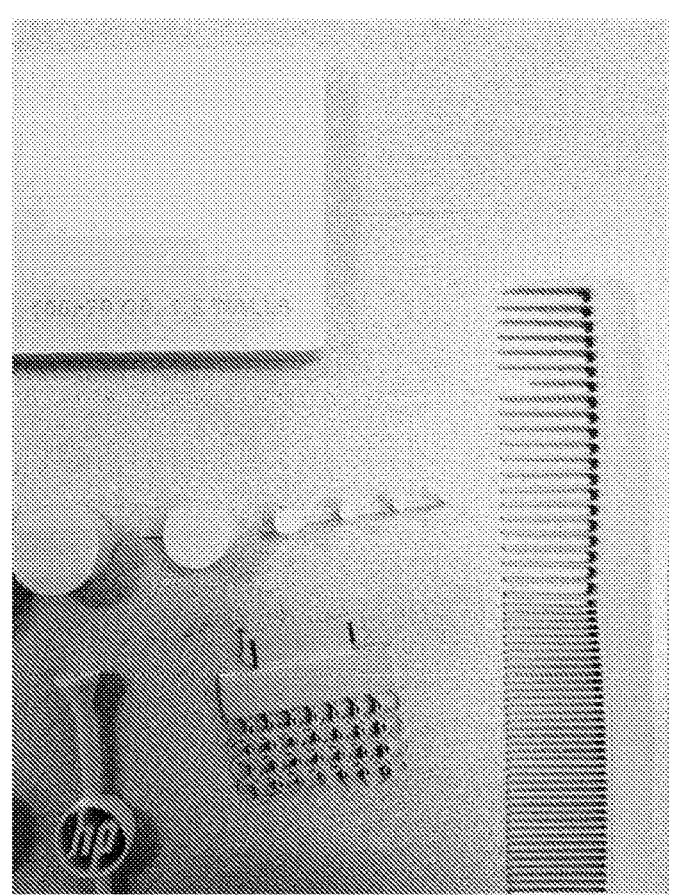
FIG. 3A is a photograph of example 3D-printed parts.
Figure 3B:
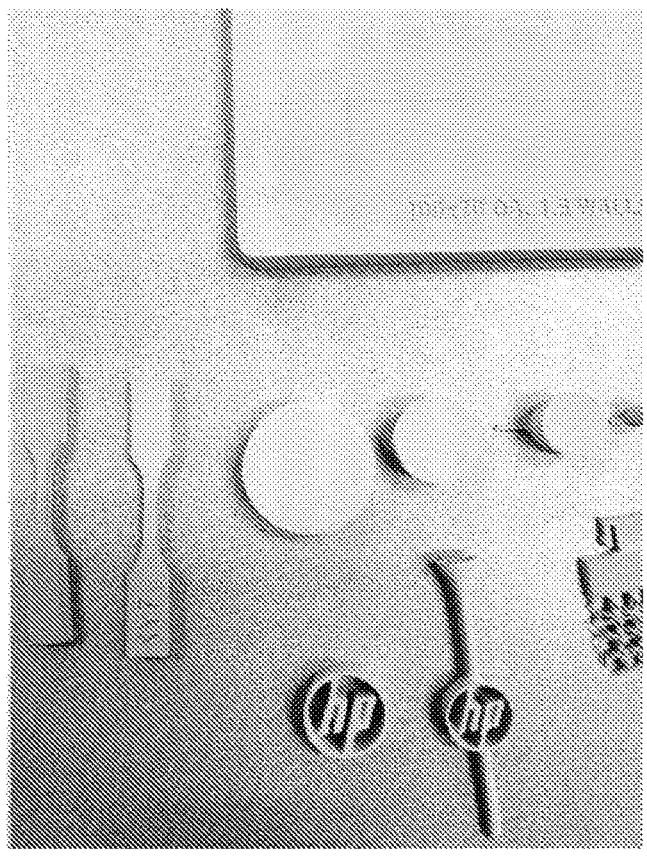
FIG. 3B is a photograph of example 3D-printed parts.

FIGS. 3A-3B illustrate 3D parts experimentally printed using a commercially available PA-12 (polyamide with a TiO$_2$ whitener) build material composition, a fusing agent composition according to Table 1 or Table 2, and a fusing assist composition according to Table 3.

The parts were printed using a MJF 3D printer according to the following general procedure:

Bed temperature: 165° C.
Layer thickness: 120 μm
Irradiation: 455 nm LED
10 contone fusing agent composition
60 contone fusing assist composition For the fusing agent compositions, 10 contone corresponds to amounts of carbon black in the part of 0.068% (for the fusing agent composition A of Table 1) and 0.0068% for a fusing agent composition B of Table 2 having 0.5% active carbon black). 60 contone fusing assist composition C corresponds to 8.2% of the composition in the powdered part, though as this is mainly water and co-solvent it will evaporate off during the thermal treatment and is not present in the final part.

Figure 4A:
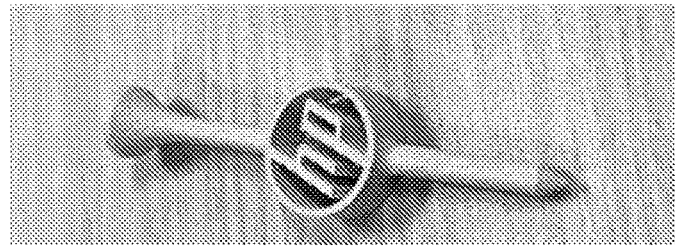
FIG. 4A is a photograph of a 3D-printed parts obtained using a kit of the present disclosure.
Figure 4B:
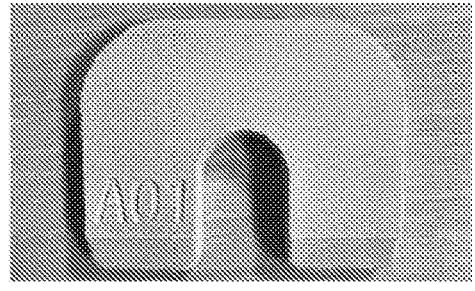
FIG. 4B is a photograph of a 3D-printed parts obtained using a kit of the present disclosure.

The printed parts had coordinates on average of L*=81, a*=−0.6, and b*=0.3, as measured using a MetaVue Xrite spectrophotometer. FIG. 4A illustrates a part printed using a fusing agent composition according to Table 1 and a fusing assist composition according to Table 3. The part was determined to have an L* of about 81, while FIG. 4B illustrates a part printed using a fusing agent composition according to Table 2 and a fusing assist composition according to Table 3. The part was determined to have an L* of about 86.

Although specific examples have been illustrated and described herein, a variety of alternate and/or equivalent implementations may be substituted for the specific examples shown and described without departing from the scope of the present disclosure. This application is intended to cover any adaptations or variations of the specific examples discussed herein. Therefore, it is intended that this disclosure be limited only by the claims and the equivalents thereof. Unless otherwise stated, the features of any dependent claim can be combined with the features of any of the other dependent claims, and any other independent claim.

The invention claimed is:

1. A kit for three-dimensional (3D) printing, the kit comprising:
a build material composition;
a fusing agent composition including:
a radiation absorber present in an amount ranging from about 0.01 wt % to about 2.0 wt % of a total weight of the fusing agent composition, wherein the radiation absorber absorbs radiation at a wavelength range within the visible light spectrum; and
a fusing assist composition consisting of:
a first co-solvent that is a plasticizing solvent;
a second co-solvent;
optionally an additive selected from the group consisting of a surfactant, a buffer, a biocide, and a combination thereof; and
a balance of water.

2. The kit of claim 1, wherein the radiation absorber is a visible-light absorbing colorant selected from the group consisting of a pigment and a dye, and wherein the radiation absorber is to absorb the radiation at the wavelength range and convert the radiation to thermal energy.

3. The kit of claim 1, wherein the radiation absorber is present in an amount ranging from about 0.01 wt % to about 1 wt % of the total weight of the fusing agent composition.

4. The kit of claim 1, wherein the radiation absorber is carbon black.

5. The kit of claim 1, wherein the plasticizing solvent is selected from the group consisting of poly(trimethylene glycol), benzyl alcohol (BnOH), and diethylene glycol butyl ether (DEGBE).

6. The kit of claim 1, wherein the second co-solvent is selected from the group consisting of 2-hydroxyethyl pyrrolidone (HE2P), 1,5-pentanediol, 1,2-hexanediol, 2-pyrrolidinonetriethylene glycol, tetraethylene glycol, 2-methyl-1, 3-propanediol, 1,6-hexanediol, diethylene glycol butyl ether, 1,2-propanediol, tripropylene glycol methyl ether, glycerol, ethylene glycol, propylene glycol, butylene glycol, pentylene glycol, hexylene glycol, ethylene glycol monomethyl ether, ethylene glycol monoethyl ether, ethylene glycol monopropyl ether, ethylene glycol monoisopropyl ether, ethylene glycol monobutyl ether, ethylene glycol monophenyl ether, ethylene glycol monobenzyl ether, propylene glycol methyl ether, diethylene glycol monomethyl ether, diethylene glycol monoethyl ether, diethylene glycol monon-butyl ether, dipropyleneglycol methyl ether, ethylene glycol dimethyl ether, ethylene glycol diethyl ether, and ethylene glycol dibutyl ether.

7. The kit of claim 1, wherein the first co-solvent is present in an amount ranging from 5 wt % to 25 wt % of the total weight of the fusing assist composition, and wherein the second co-solvent is present in an amount ranging from 30 wt % to 70 wt % of the total weight of the fusing assist composition.

8. The kit of claim 1, wherein the build material composition comprises a polymeric build material or a polymeric composite build material.

9. The kit of claim 1, wherein the build material composition comprises a polymeric build material, and wherein the polymeric build material is selected from the group consisting of polyamides, polyethylene, polypropylene, polyoxomethylene, polystyrene, polycarbonate, polyester, polyurethanes, and copolymers thereof.

10. The kit of claim 1, wherein the build material composition comprises a build material and a whitener selected from the group consisting of zinc oxide and $TiO_2$.

11. A method of three-dimensional (3D) printing, the method comprising:
applying a build material composition to form a build material layer;
selectively applying a fusing agent composition on a portion of the build material layer, the fusing agent composition including:
a radiation absorber present in an amount ranging from about 0.01 wt % to about 2.0 wt % of a total weight of the fusing agent composition, wherein the radiation absorber absorbs radiation at a wavelength range within the visible light spectrum;
selectively applying a fusing assist composition on the portion of the build material layer, the fusing assist composition consisting of:
a first co-solvent that is a plasticizing solvent;
a second co-solvent;
optionally an additive selected from the group consisting of a surfactant, a buffer, a biocide, and a combination thereof; and
a balance of water; and
exposing the applied fusing agent and fusing assist compositions and the portion of the build material layer to radiation at the wavelength range within the visible light spectrum to fuse the portion of the build material layer and to form a layer of a 3D part.

12. The method of claim 11, wherein the fusing agent composition is selectively applied such that the build material layer comprises the radiation absorber in an amount ranging from about 0.0001 wt % to about 0.1 wt %.

13. The method of claim 11, wherein the fusing agent composition and the fusing assist composition are applied in a ratio of from 4:6 to 1:25.

* * * * *